(12) United States Patent
Jung et al.

(10) Patent No.: US 9,640,328 B2
(45) Date of Patent: May 2, 2017

(54) CATALYTIC METAL WITH NANOCUP OR NANORING STRUCTURE AND ELECTRODES USING THE SAME

(75) Inventors: Gun Young Jung, Gwangju (KR); Hui Su Jeong, Gwangju (KR)

(73) Assignee: GWANGJU INSTITUTE OF SCIENCE AND TECHNOLOGY, Buk-Gu, Gwangju (KR)

( * ) Notice: Subject to any disclaimer, the term of this patent is extended or adjusted under 35 U.S.C. 154(b) by 918 days.

(21) Appl. No.: 13/598,075

(22) Filed: Aug. 29, 2012

(65) Prior Publication Data
US 2013/0059232 A1 Mar. 7, 2013

(30) Foreign Application Priority Data
Sep. 1, 2011 (KR) .................. 10-2011-0088721

(51) Int. Cl.
| | |
|---|---|
| *H01M 4/90* | (2006.01) |
| *H01M 4/88* | (2006.01) |
| *H01M 4/92* | (2006.01) |
| *B82Y 30/00* | (2011.01) |
| *B82Y 40/00* | (2011.01) |
| *H01G 9/20* | (2006.01) |

(52) U.S. Cl.
CPC ........ *H01G 9/2022* (2013.01); *H01M 4/8825* (2013.01); *H01M 4/92* (2013.01); *B82Y 30/00* (2013.01); *B82Y 40/00* (2013.01); *H01G 9/2031* (2013.01); *H01G 9/2059* (2013.01); *H01M 4/8803* (2013.01); *H01M 4/9075* (2013.01); *Y02E 10/542* (2013.01)

(58) Field of Classification Search
CPC ............ H01M 4/9075; H01M 4/8807; H01M 4/8803; H01M 4/92
See application file for complete search history.

(56) References Cited

U.S. PATENT DOCUMENTS

| | | | |
|---|---|---|---|
| 2007/0077478 A1* | 4/2007 | Nguyen et al. ................. | 429/33 |
| 2008/0314626 A1* | 12/2008 | Moore .......................... | 174/255 |
| 2009/0214944 A1* | 8/2009 | Rojeski ................ | H01M 4/131 |
| | | | 429/142 |
| 2009/0220835 A1* | 9/2009 | Yushan et al. .................. | 429/30 |
| 2010/0260946 A1* | 10/2010 | Jia et al. ....................... | 427/569 |

* cited by examiner

*Primary Examiner* — Rena D Cronin
(74) *Attorney, Agent, or Firm* — Nath, Goldberg & Meyer; Joshua B. Goldberg; Christopher Thomas

(57) ABSTRACT

Provided are an electrode including a nanostructure and a method of preparing the same, and more particularly, an electrode including a substrate, and a plurality of metal nanocups or nanorings spaced apart from one another and disposed on the substrate, and openings thereof are aligned above the substrate, and a method of preparing the electrode. An electrode of the present invention includes catalytic metal having a structure of the plurality of nanocups or nanorings and thus, an area, in which a reactant participating in an oxidation or reduction reaction is able to be in contact with catalytic metal, may become wider in comparison to that of a typical electrode having catalytic metal in the shape of a flat thin film. Accordingly, an efficiency of the oxidation or reduction reaction may be improved due to catalytic metal and eventually, a power generation efficiency of a cell may be improved.

10 Claims, 22 Drawing Sheets

CATALYTIC METAL WITH NANOCUP OR NANORING STRUCTURE AND ELECTRODES USING THE SAME

CROSS-REFERENCE TO RELATED APPLICATION

This application claims priority to Korean Patent Application No. 10-2011-0088721 filed on 1 Sep. 2011 and all the benefits accruing therefrom under 35 U.S.C. §119, the contents of which are incorporated by reference in their entirety.

BACKGROUND

The present invention disclosed herein relates to electrodes including a nanostructure, and more particularly, to electrodes using catalytic metal having a nanocup or nanoring structure in which a structure of catalytic metal usable in a fuel cell or a dye-sensitized solar cell is improved.

A nanostructure denotes a structure having a nanoscale dimension, i.e., a size of approximately $10^{-9}$ m, a nanometer unit. The nanostructure exhibits various physical and chemical characteristics, which could not be discovered in a conventional material, such as nanoscale dimension, quantum confinement effect, superior crystallinity, and high surface area to volume. Many attempts have been made to apply nanostructures exhibiting various electrical or optical characteristics according to their sizes or shapes to typical electrochemical devices or optical devices, and as a result of such research and development, devices may be miniaturized as well as being advanced. Despite the wealth of technological advancements to date, research and development for improving performances of various metal nanostructures and various devices using the metal nanostructures have currently been undertaken.

Meanwhile, a dye-sensitized solar cell (DSSC) is an energy conversion device that converts light energy into electrical energy by the transfer of electrons and holes generated in a dye having light energy absorbed therein through the application of the photosynthesis process of plants. When referred to FIG. 1A schematically showing structure and power generation principle of a typical dye-sensitized solar cell, the dye-sensitized solar cell has a sandwich structure of two transparent substrates. The cell is composed of a transparent electrode coated on a transparent substrate, semiconducting oxide composed of nanoparticles adhered to the transparent electrode, a dye polymer coated in a monomolecular layer on surfaces of the semiconducting oxide particles, an electrolyte solution filling a space having a thickness range of 30 μm to 100 μm between two electrodes, and a counter electrode. When sunlight is absorbed in the semiconducting oxide electrode having dye molecules chemically adsorbed to the surface thereof, dye molecules generate electron-hole pairs, and electrons are injected into a conduction band of the semiconducting oxide and then move to the transparent conductive layer through interfaces between nanoparticles and the counter electrode through an external conducting wire. In the dye-sensitized solar cell, one surface of the counter electrode in contact with the electrolyte is coated with catalytic metal as a way of promoting a reduction reaction of the electrolyte. With respect to the dye-sensitized solar cell, the reduction reaction of the electrolyte is performed at the counter electrode and hereinafter, in the case that the electrode of the present invention is referred to as "reduction electrode" in relation to the dye-sensitized solar cell, the electrode is defined to refer to "counter electrode" of the dye-sensitized solar cell.

Different from the dye-sensitized solar cell, a fuel cell is an energy conversion device that directly converts chemical energy from a fuel into electrical energy through a chemical reaction. When referred to FIG. 1B schematically showing structure and power generation principle of a typical fuel cell, the fuel cell is composed of an electrolyte inserted between an oxidation electrode and a reduction electrode, and an oxidation reaction of hydrogen occurs at the oxidation electrode and a reduction reaction of oxygen occurs at the reduction electrode. When the power generation principle of the fuel cell is described in more detail, electrons and hydrogen ions are generated as hydrogen is oxidized at the oxidation electrode. The generated electrons and hydrogen ions are transferred to the reduction electrode respectively through an external circuit and the electrolyte, and then an entire circuit is completed as a reduction reaction of the transferred hydrogen ions and electrons with oxygen supplied from the reduction electrode occurs to generate water. Therefore, an electric potential of the cell obtained through the fuel cell is defined as a difference between an electric potential generated when hydrogen is oxidized at the oxidation electrode and an electric potential generated when oxygen is reduced at the reduction electrode. In the fuel cell, one surface of the oxidation electrode or the reduction electrode in contact with the electrolyte is coated with catalytic metal as a way of promoting an oxidation/reduction reaction of the oxidation electrode or the reduction electrode.

In various cells generating electrical energy by using an oxidation/reduction reaction including the reduction electrode of the dye-sensitized solar cell or the oxidation or reduction electrode of the fuel cell, catalytic metal coated on one side of the electrode to promote the oxidation or reduction reaction is generally coated by using a physical or electrochemical deposition method. In the case that catalytic metal is coated by using the physical or electrochemical deposition method, the catalytic metal is coated in the shape of a flat thin film on the electrode. In view of surface area, with respect to the catalytic metal having the shape of the flat thin film, an area having a catalytic reaction generated therein may be limited. That is, with respect to the catalytic metal having a typical flat thin film structure, an area, in which electrons can move during an oxidation or reduction reaction, is limited to an area of the flat metal thin film. Such structural limitation of the catalytic metal must be addressed to improve a power generation efficiency of the cell. However, a technique for addressing the limitation has not been suggested to date.

SUMMARY

The present invention provides an electrode including nanostructured catalytic metal having an improved oxidation or reduction reaction efficiency.

The present invention also provides a method of preparing an electrode including nanostructured catalytic metal having an improved oxidation or reduction reaction efficiency.

In accordance with an exemplary embodiment of the present invention, an electrode includes: a substrate; and a plurality of metal nanocups spaced apart from one another and disposed on the substrate, and openings thereof are aligned above the substrate or a plurality of metal nanorings spaced apart from one another and disposed on the substrate, and first openings thereof are aligned above the substrate.

In accordance with another exemplary embodiment of the present invention, a method includes: forming a polymer layer on a substrate; forming a hole pattern in the polymer layer to expose an upper surface of the substrate; forming metal nanocups or metal nanorings by performing glancing angle deposition of metal on the upper surface of the substrate exposed through the hole pattern and inner circumferences of the hole pattern while rotating the substrate; and removing the polymer layer.

BRIEF DESCRIPTION OF THE DRAWINGS

Exemplary embodiments can be understood in more detail from the following description taken in conjunction with the accompanying drawings, in which.

DETAILED DESCRIPTION OF EMBODIMENTS

Figure 1A:
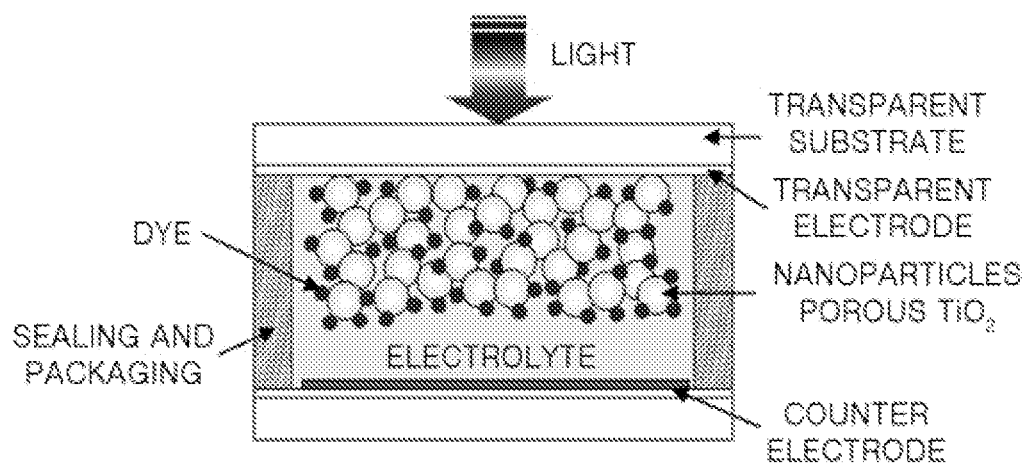
FIG. 1A is a schematic view illustrating structure and power generation principle of a typical dye-sensitized solar cell.
Figure 1B:
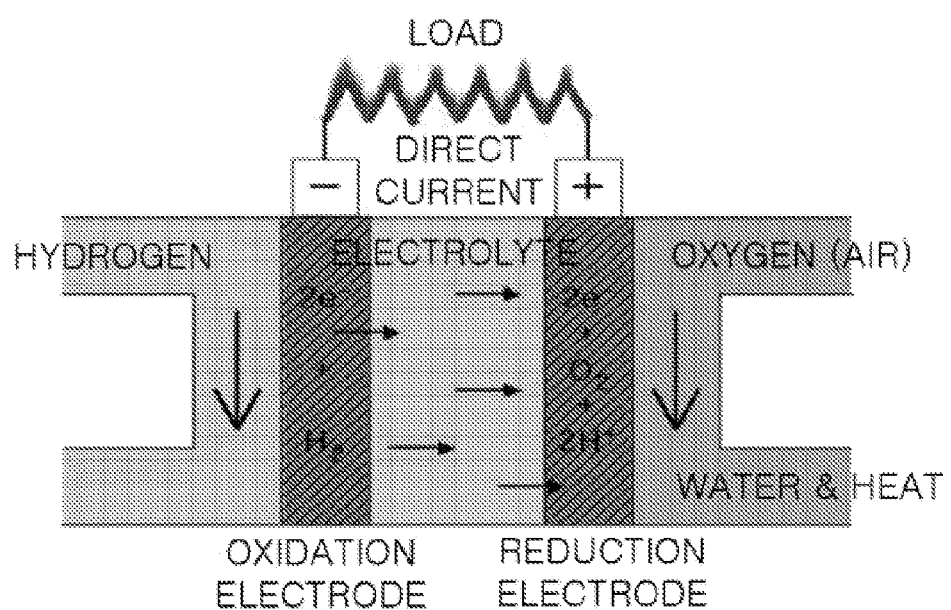
FIG. 1B is a schematic view illustrating structure and power generation principle of a typical fuel cell.

Hereinafter, specific embodiments will be described in detail with reference to the accompanying drawings. The present invention may, however, be embodied in different forms and should not be construed as limited to the embodiments set forth herein. In the figures, the dimensions of layers and regions are exaggerated for clarity of illustration. Like reference numerals refer to like elements throughout. Moreover, detailed descriptions related to well-known functions or configurations will be ruled out in order not to unnecessarily obscure subject matters of the present invention.

Figure 2A:
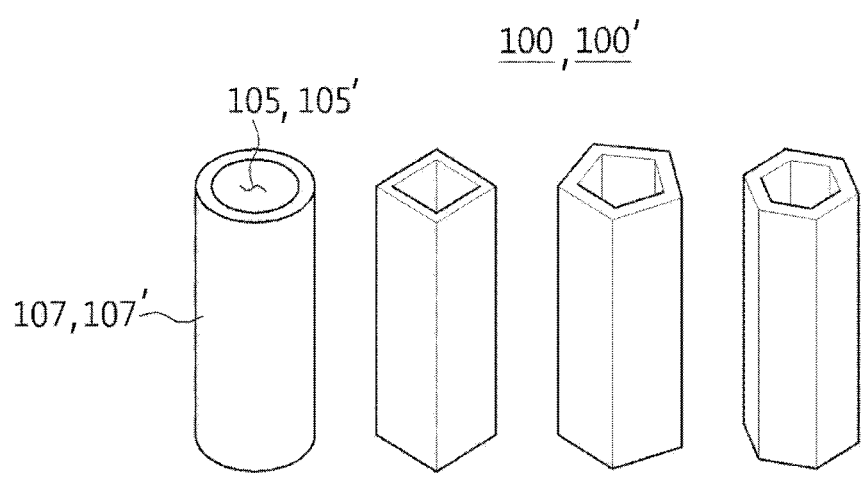
FIGS. 2A through 2C are respectively a perspective view, a longitudinal sectional view, and a plan view illustrating various structures of a metal nanostructure disclosed in the present invention.
Figure 2B:
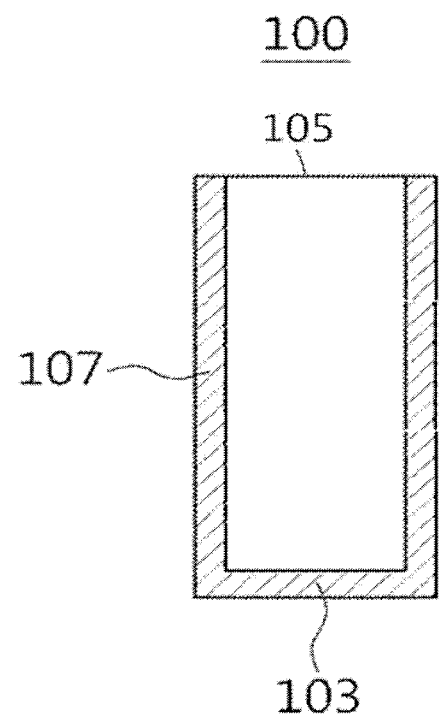
Figure 2C:
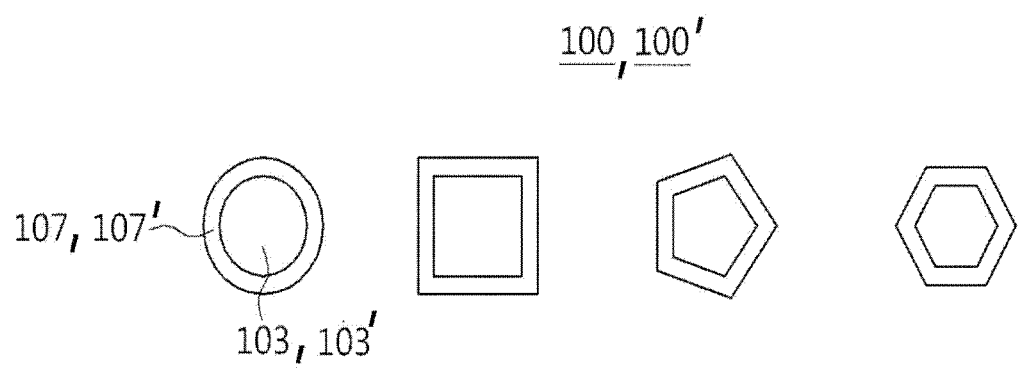
Figure 2D:
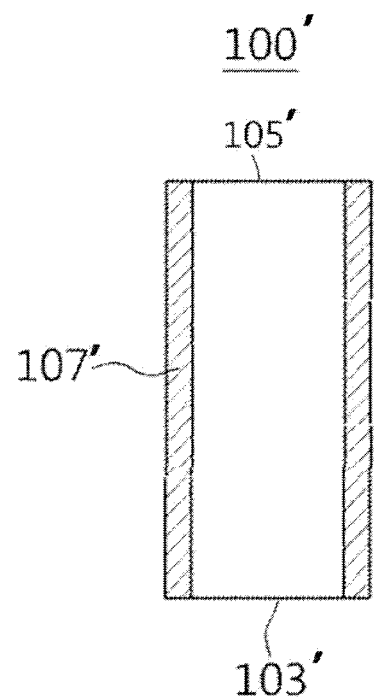
FIG. 2D is a longitudinal sectional view of a metal nanoring disclosed in the present invention.

FIG. 2A is a perspective view exemplarily illustrating various structures of a metal nanocup or metal nanoring disclosed in the present invention, FIG. 2B is a longitudinal sectional view of each metal nanocup structure shown in FIG. 2A, FIG. 2C is a plan view of each metal nanocup or metal nanoring structure shown in FIG. 2A, and FIG. 2D is a longitudinal sectional view of a metal nanoring structure disclosed in the present invention.

Referring to FIGS. 2A, 2B, and 2D, a metal nanostructure of the present invention is a structure having a hollow cylindrical shape. The metal nanostructure may be formed in the shape of a nanocup 100 in which a lower surface 103 thereof is closed and an upper surface 105 thereof is opened, and may be formed in the shape of a nanoring 100' in which both lower surface 103' and upper surface 105' thereof are opened. That is, the only difference between the metal nanocup 100 and the metal nanoring 100' is whether the lower surfaces 103 and 103' of the hollow cylindrical shapes are opened or not, and all other features are the same. Therefore, the features of the present invention will be described with reference to the representative metal nanocup 100 in the present specification and description related to the metal nanoring 100' will be omitted except for special cases. Although the description is omitted in the present specification, technical features including effects of the present invention are applied to the metal nanoring 100' equivalent to the metal nanocup 100.

Referring to FIG. 2C, the upper surfaces 105 or 105' and the lower surfaces 103 or 103' of the metal nanocup 100 or the metal nanoring 100' may be formed in the shape of a circle, ellipse, or polygon, and the upper surfaces 105 or 105' and the lower surfaces 103 or 103' may be formed in the shape having the same size or different sizes. Although nanocup structures having circular cylindrical, rectangular cylindrical, pentagonal cylindrical, and hexagonal cylindrical shapes are only shown in FIGS. 2A and 2C, FIGS. 2A and 2C are merely exemplary views for describing structures of the metal nanocup 100 or the metal nanoring 100' of the present invention and the structures thereof are not limited thereto. That is, the structures of the metal nanocup 100 or the metal nanoring 100' of the present invention may not only be formed in the shapes of circular cylinder, rectangular cylinder, pentagonal cylinder, and hexagonal cylinder, but may also be formed in the shapes of various polygonal cylinders, such as a heptagonal cylinder and an octagonal cylinder including an elliptical cylinder, according to the choice of those skilled in the art. However, even in the case that the structures are formed in various shapes as described above, a longitudinal section having the widest area in the structures of the metal nanocup 100 or the metal nanoring 100' of the present invention may have the shapes shown in FIG. 2B (case of the nanocup) or FIG. 2D (case of the nanoring) regardless of the shapes of the upper surfaces 105 or 105' or the lower surfaces 103 or 103'.

Hereinafter, terms used in the present invention will be described according to the above descriptions.

A "metal nanocup" referred in the present invention is a hollow cylindrical metal structure, in which the widest longitudinal section has the shape of "Ц" as shown in FIG.

2B, and denotes a nanostructure having a lower surface and an upper surface thereof closed and opened, respectively. The nanocup only denotes that a structure having a cup shape may be miniaturized to a nanosize and may also include a micro-sized structure greater than the foregoing.

Also, a "metal nanoring" referred in the present invention is a hollow cylindrical metal structure, in which the widest longitudinal section has the shape of "| |" as shown in FIG. 2D, and denotes a nanostructure having both lower surface and upper surface thereof opened. The nanoring only denotes that a structure having a ring shape may be miniaturized to a nanosize and may also include a micro-sized structure greater than the foregoing.

Also, an "opening" referred in the present invention denotes an opened upper surface of the metal nanocup and has a meaning that may be used interchangeably with "the opened upper surface 105" of the metal nanocup.

Further, a "first opening" referred in the present invention denotes an opening not in contact with a substrate or a metal layer among two openings formed at the upper surface and the lower surface of the metal nanoring, and has a meaning that may be used interchangeably with "the opened upper surface 105'" of the metal nanoring.

In addition, an "inner circumference" referred in the present invention denotes a circumference of an edge in the shape of the opening or the first opening.

Figure 3A:
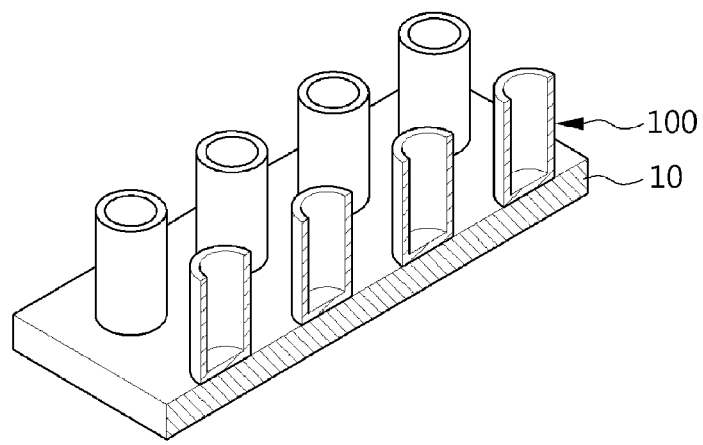
FIGS. 3A through 3C are respectively a perspective view, a side sectional view, and a plan view exemplarily illustrating an electrode in accordance with a first embodiment of the present invention.
Figure 3B:
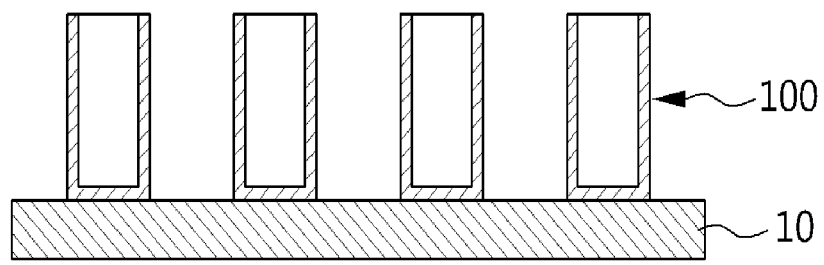
Figure 3C:
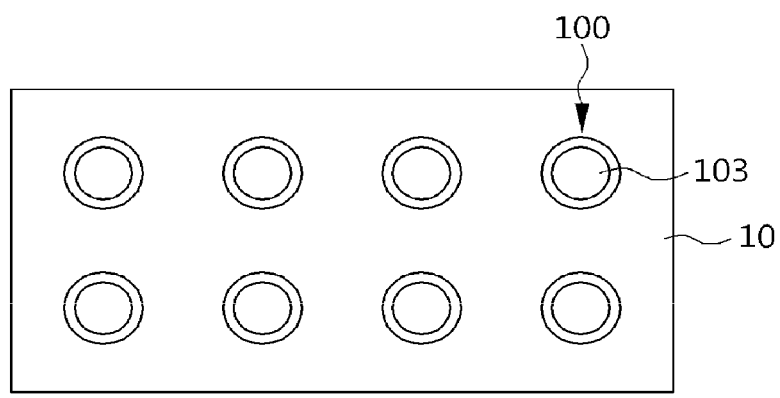

FIG. 3A is a perspective view exemplarily illustrating an electrode in accordance with a first embodiment of the present invention. FIG. 3B is a side sectional view illustrating the electrode in accordance with the first embodiment of the present invention, and FIG. 3C is a cross-sectional view illustrating the electrode in accordance with the first embodiment of the present invention along a direction of an opening of a metal nanocup.

Referring to FIG. 3A, the electrode of the present invention includes a substrate 10 and the plurality of metal nanocups 100. As shown in FIG. 3B, the metal nanocup 100 has the opening 105 aligned above the substrate 10 and are physically or chemically bonded to the substrate 10. As shown in FIG. 3C, the plurality of metal nanocups 100 having a predetermined period may be disposed on the substrate 10.

The substrate 10 acts to support the metal nanocups 100 as well as being connected to an external conducting wire and thus, allows electrons generated in a cell to flow into the external conducting wire (in the case of oxidation electrode) or allows electrons introduced through the external conducting wire to flow into an electrolyte (in the case of reduction electrode). Therefore, the substrate 10 may be formed of a conductive material in which electrons are movable. The conductive material may be appropriately selected by those skilled in the art according to a type of a cell to be prepared. For example, in the case that the type of the cell to be prepared is a dye-sensitized solar cell, the substrate 10 may be a transparent conductive material such as indium tin oxide (ITO), F-doped $SnO_2$ (FTO), Al-doped ZnO (AZO), Ga-doped ZnO (GZO), In, Ga-doped ZnO (IGZO), Mg-doped ZnO (MZO), Mo-doped ZnO, Al-doped MgO, Ga-doped MgO, Nb-doped $TiO_2$, or $CuAlO_2$. In the case that the type of the cell is a fuel cell, the substrate 10 may be a conductive porous material such as carbon paper, carbon cloth, carbon felt, metal cloth, or polymer membrane.

The metal nanocup 100 provides an interface in which an oxidation or reduction reaction is performed and is formed of catalytic metal promoting the oxidation or reduction reaction performed at the electrode. The catalytic metal may be any one or an alloy of two or more selected from the group consisting of platinum (Pt), iron (Fe), cobalt (Co), nickel (Ni), ruthenium (Ru), rhodium (Rh), palladium (Pd), osmium (Os), iridium (Ir), copper (Cu), silver (Ag), gold (Au), tin (Sn), aluminum (Al), chromium (Cr), and titanium (Ti). In particular, the catalytic metal may be platinum. The catalytic metal may not only provide an interface having an oxidation or reduction reaction being performed thereon, but may also improve generation of electrons and a reduction reaction rate of the electrolyte through promoting the foregoing reaction.

As shown in FIG. 3B, the longitudinal section of the metal nanocup 100 may have the shape of "Ц". Different from catalytic metal formed in the shape of a flat thin film layer in a typical electrode, the catalytic metal is formed in the shape of "Ц" and thus, an oxidation or reduction reaction may not only occur at a "_" portion corresponding to the lower surface 103 of the metal nanocup 100, but may also occur at an inner surface and an outer surface of a "| |" portion corresponding to a column 107 of the metal nanocup 100. Since the catalytic metal is formed as a nanocup structure, the interface, in which an oxide or reduction reaction is generated, may become wide due to the catalytic metal and the oxidation or reduction reaction may be further promoted. Although the nanocups 100 are shown in the shape of a hollow circular cylinder in FIGS. 3A through 3C, this is merely an exemplary embodiment for describing the present invention, and as described above, the nanocup 100 may be formed in the shape of an elliptical or polygonal hollow cylinder. Even in the case that the metal nanocup 100 is formed in the shape of the elliptical or polygonal hollow cylinder, an effect of promoting an oxidation or reduction reaction according to an increase in the interface of the oxidation or reduction reaction may be the same.

The electrode is included in the cell and thus, may be used as an oxidation electrode or a reduction electrode. In the case that the electrode corresponds to the oxidation electrode in the cell, electrons among the product of an oxidation reaction promoted in the plurality of metal nanocups 100 are transferred or moved to the substrate 10. In the case that the electrode corresponds to the reduction electrode in the cell, a reduction reaction is promoted in the metal nanocups 100 by the use of electrons provided from the substrate 10.

Figure 3D:
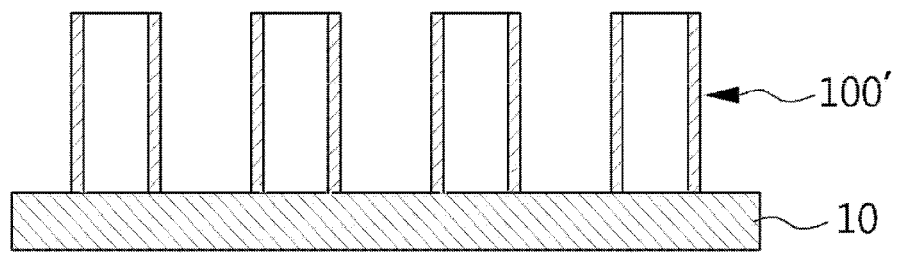
FIG. 3D is a side sectional view exemplarily illustrating an electrode in accordance with a second embodiment of the present invention.

FIG. 3D is a side sectional view illustrating an electrode in accordance with a second embodiment of the present invention. The electrode includes a substrate and a plurality of metal nanorings. The electrode according to the second embodiment has only a difference in that it includes the metal nanoring 100' instead of the metal nanocup 100, but other configurations and effects are the same as those of the electrode according to the first embodiment. Therefore, description related to the other configurations will be omitted and a structure of the metal nanoring 100' will only be described below.

As shown in FIG. 3D, the longitudinal section of the metal nanoring 100' may have the shape of "| |". Different from catalytic metal formed in the shape of a flat thin film layer in a typical electrode, the catalytic metal is formed in the shape of "| |" and thus, an oxidation or reduction reaction may also occur at an inner surface and an outer surface of a "| |" portion corresponding to a column 107' of the metal nanoring 100'. Since the catalytic metal is formed as a nanoring structure, the interface, in which an oxide or reduction reaction is generated, may become wide due to the catalytic metal and the oxidation or reduction reaction may be further promoted. The metal nanoring 100' like the metal nanocup 100 may be formed in the shape of an elliptical or polygonal hollow cylinder. Even in the case that the metal nanoring 100' is formed in the shape of the elliptical or polygonal hollow cylinder, an effect of promoting an oxidation or reduction reaction according to an increase in the interface of the oxidation or reduction reaction may be the same.

Figure 4A:
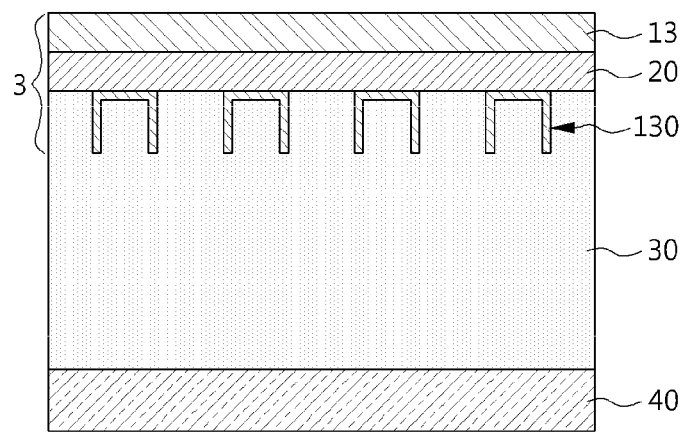
FIG. 4A is an exemplary view illustrating an example in which the electrode in accordance with the first embodiment of the present invention is embodied in a dye-sensitized solar cell.

FIG. 4A is an exemplary view illustrating an example in which the electrode in accordance with the first embodiment of the present invention is embodied in a unit cell of a dye-sensitized solar cell.

Referring to FIG. 4A, the electrode of the present invention may be used as a reduction electrode in the unit cell of the dye-sensitized solar cell. In the case that the electrode of the present invention is used as a reduction electrode 3 in the unit cell of the dye-sensitized solar cell, metal nanocups 130 are disposed to be in contact with an electrolyte layer 30 of the unit cell. The metal nanocups 130 promote a reduction reaction of an electrolyte included in the electrolyte layer 30 by the use of electrons provided from a substrate 13, and as described above, since the nanocups 130 are formed in a hollow cylindrical shape, a reaction interface wider than that of a typical thin film-type catalytic metal layer may be provided. In the case that the electrode of the present invention is used as the reduction electrode in the unit cell of the dye-sensitized solar cell, the electrode of the present invention may further selectively include a separate metal layer 20 between the substrate 13 and the metal nanocups 130 as shown in FIG. 4A. The separate metal layer 20 will be described in more detail below with reference to FIGS. 4B and 4C.

Figure 4B:
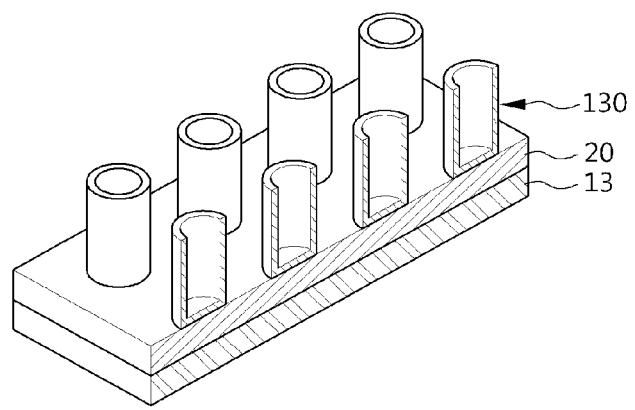
FIGS. 4B and 4C are a perspective view and a side sectional view of the electrode used in the example of the present invention, respectively.
Figure 4C:
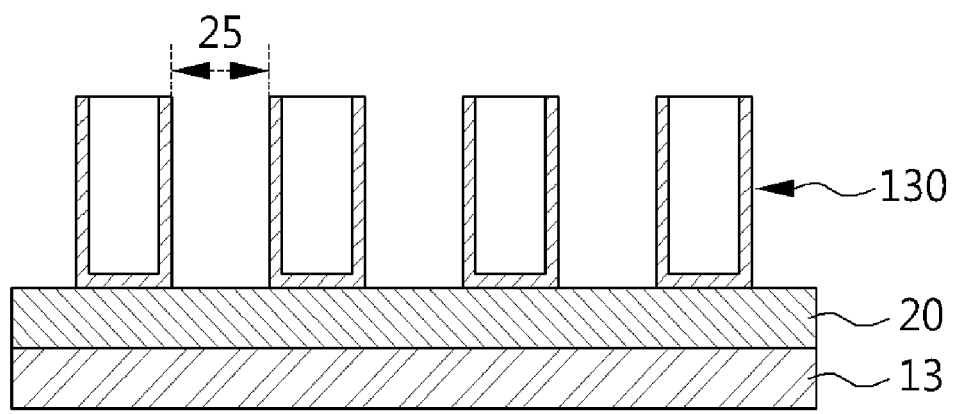

FIG. 4B is a perspective view of the electrode used in the example shown in FIGS. 4A and 4C is a side sectional view of the electrode used in the example shown in FIG. 4A.

Referring to FIG. 4B, the electrode used in the example shown in FIG. 4A has the same components as those shown in FIG. 3A, but the separate metal layer 20 is further included. Therefore, description related to the same components as those shown in FIG. 3A will be omitted and the separate metal layer 20 further included will only be described in detail.

Referring to FIGS. 4B and 4C, the metal layer 20 is formed on the substrate 13 and the plurality of metal nanocups 130 are formed on the metal layer 20 to allow the openings 105 to be aligned above the metal layer 20. Also, the plurality of metal nanocups 130 having a predetermined period are physically or chemically bonded to the meal layer 20. The metal layer 20 may allow a catalytic reaction to be performed in a spacing 25 between the metal nanocups 130. That is, as shown in FIG. 4C, the metal layer 20 may allow the reduction reaction of the electrolyte to be also promoted in the spacing 25 between "Ц" and "Ц", and thus, may further improve a generation efficiency of the dye-sensitized solar cell. Therefore, metal constituting the metal layer 20 is catalytic metal promoting an oxidation or reduction reaction performed in the electrode. The catalytic metal may be any one or an alloy of two or more selected from the group consisting of Pt, Fe, Co, Ni, Ru, Rh, Pd, Os, Ir, Cu, Ag, Au, Sn, Al, Cr, and Ti. In particular, the catalytic metal may be platinum. The catalytic metal constituting the metal layer 20 may be the same type of metal as the catalytic metal constituting the metal nanocups 130 or may be a different type of metal therefrom.

Figure 5:
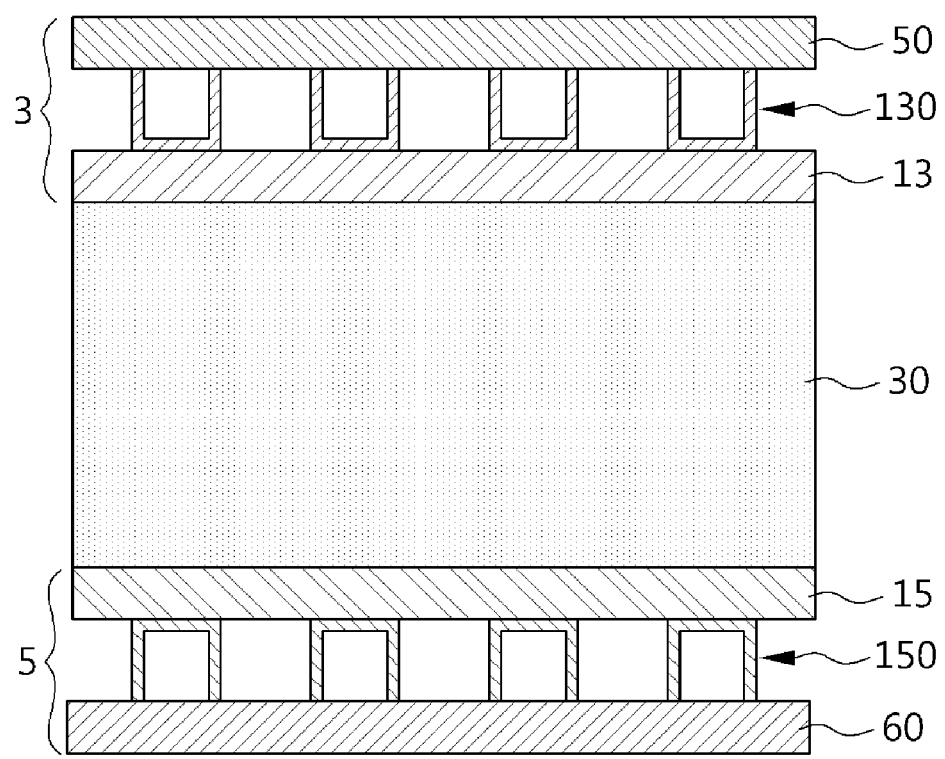
FIG. 5 is an exemplary view illustrating another example in which the electrode in accordance with the first embodiment of the present invention is embodied in a unit cell of a fuel cell.

FIG. 5 is an exemplary view illustrating another example in which the electrode in accordance with the first embodiment of the present invention is embodied in a unit cell of a fuel cell.

Referring to FIG. 5, the electrode of the present invention may be used as a reduction electrode 3 or an oxidation electrode 5 in the unit cell of the fuel cell. In the case that the electrode of the present invention is used as the reduction electrode 3 or the oxidation electrode 5 in the unit cell of the fuel cell, substrates 13 and 15 are in contact with an electrolyte layer 30 of the unit cell, and metal nanocups 130 and 150 are disposed to be in contact with an oxidation diffusion layer 50 and a hydrogen diffusion layer 60, respectively. The metal nanocups 130 of the reduction electrode 3 promote a reduction reaction of hydrogen ions, in which hydrogen ions transferred to the electrolyte layer 30 are combined with oxygen by the use of electrons provided from the substrate 13 to generate water. As described above, since metal nanocups 130 of the reduction electrode 3 are formed in a hollow cylindrical shape, a reaction area wider than that of a typical thin film-type catalytic metal layer may be provided. In contrast, the metal nanocups 150 of the oxidation electrode 5 promote an oxidation reaction of supplied hydrogen gas to improve generation efficiencies of electrons and hydrogen ions, and transfer generated electrons to the substrate 15. In the case that the electrode of the present invention is used as the reduction electrode 3 or the oxidation electrode 5 in the unit cell of the fuel cell, the electrodes 3 and 5 may have the same components as those shown in FIG. 3A. However, with respect to the fuel cell, the substrates 13 and 15 constituting the electrodes may be a conductive porous material so as to allow the supply of fuel gas to be facilitated. In particular, the substrates 13 and 15 may be carbon paper, carbon cloth, carbon felt, metal cloth, or polymer membrane.

FIGS. 6A through 6E sequentially illustrate a method of preparing an electrode of the present invention.

Referring to FIGS. 6A through 6E, the method of preparing an electrode of the present invention includes forming a polymer layer 70 on a substrate 10, forming a hole pattern in the polymer layer 70 to expose an upper surface of the substrate 10, forming metal nanocups or metal nanorings by performing glancing angle deposition of metal on the upper surface of the substrate exposed through the hole pattern and inner circumferences of the hole pattern while rotating the substrate, and removing the polymer layer 70.

Figure 6A:
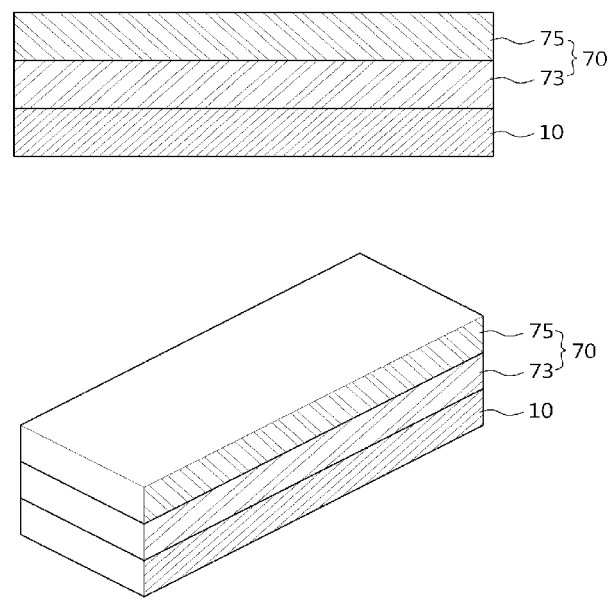
FIG. 6A is a schematic view illustrating a substrate having a polymer layer formed thereon.

FIG. 6A is a schematic view illustrating a substrate having a polymer layer formed thereon. Referring to FIG. 6A, the polymer layer 70 is formed on the substrate 10.

The substrate 10 is a base finally supporting metal nanocups 100 and may be formed of a conductive material in which electrons are movable. The conductive material may be appropriately selected by those skilled in the art according to a type of a cell to be prepared. For example, in the case that the type of the cell to be prepared is a dye-sensitized solar cell, the substrate 10 may be a transparent conductive material such as ITO, FTO, AZO, GZO, IGZO, MZO, Mo-doped ZnO, Al-doped MgO, Ga-doped MgO, Nb-doped $TiO_2$, or $CuAlO_2$. In the case that the type of the cell is a fuel cell, the substrate 10 may be a conductive porous material such as carbon paper, carbon cloth, carbon felt, metal cloth, or polymer membrane.

The polymer layer 70 is formed as a single layer or multilayer on the substrate 10 by using a method such as spin coating. In particular, the polymer layer 70 may have a structure in which a sacrificial layer 73 and a resist layer 75 are sequentially stacked. The sacrificial layer 73 acts to maintain the adhesion between the substrate 10 and the resist layer 75, and a material constituting the sacrificial layer 73 may be appropriately selected by those skilled in the art according to a method of a lift-off process to be performed. In particular, in the case that the lift-off process is performed by using a wet etching method, the sacrificial layer 73 may be a polymer having a property well soluble in a solvent for etching and for example, the sacrificial layer 73 may be polymethyl methacrylate (PMMA) or LOL1000. The resist layer 75 is formed as a single layer or multilayer on the sacrificial layer 73 by using a method such as spin coating. The resist layer 75 is a layer having the hole pattern formed therein and a material constituting the resist layer 75 may be appropriately selected by those skilled in the art according to a lithography method used. For example, in the case that the lithography method is nanoimprint lithography (NIL), the material constituting the resist layer 75 may be an ultraviolet (UV)-curable resist, and any polydimethylsiloxane (PDMS)-based UV-curable material may be used as the UV-curable resist.

Before the polymer layer 70 is formed on the substrate 10, a separate metal layer (not shown) is further deposited on the substrate 10 and the polymer layer 70 may be formed on the metal layer (not shown). The metal layer (not shown) may be formed of any one or an alloy of two or more selected from the group consisting of Pt, Fe, Co, Ni, Ru, Rh, Pd, Os, Ir, Cu, Ag, Au, Sn, Al, Cr, and Ti.

Figure 6B:
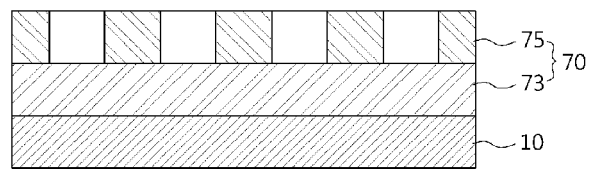
FIG. 6B is a schematic view illustrating a substrate in which a hole pattern is formed on a resist layer.
Figure 6B:
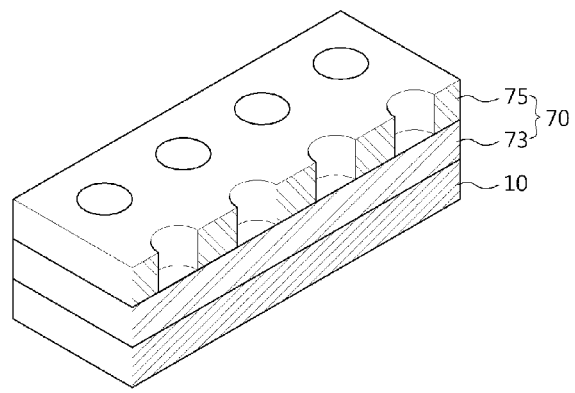
Figure 6C:
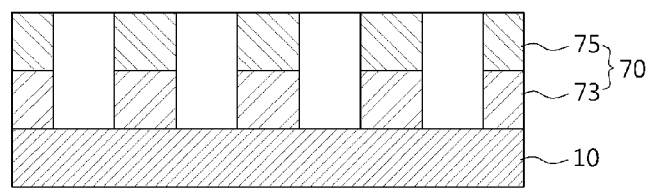
FIG. 6C is a schematic view illustrating a substrate in which a hole pattern is formed to expose an upper surface of the substrate.
Figure 6C:
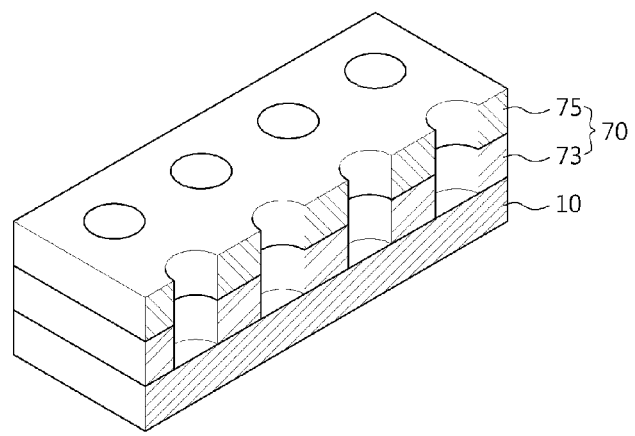
Figure 6D:
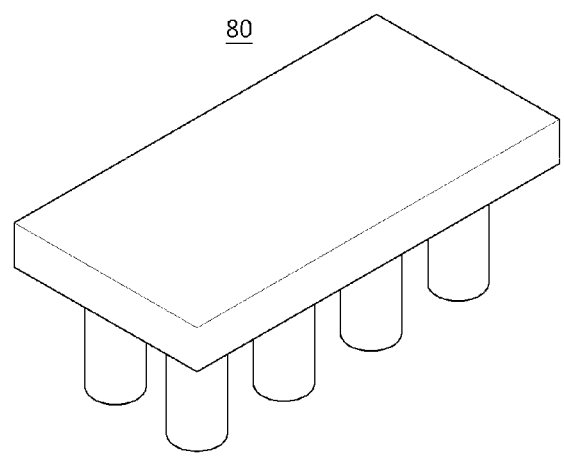
FIG. 6D is an exemplary view illustrating a nanoimprint lithography stamp used in an exemplary embodiment of a method of preparing an electrode of the present invention.

FIG. 6B is a schematic view illustrating a substrate in which a hole pattern is formed on a resist layer, FIG. 6C is a schematic view illustrating a substrate in which a hole pattern is formed to expose an upper surface of the substrate, and FIG. 6D is an exemplary view illustrating a nanoimprint lithography stamp used in an exemplary embodiment of a method of preparing an electrode of the present invention.

Referring to FIGS. 6B and 6C, the hole pattern formed in the resist layer 75 is transferred to the sacrificial layer 73 through etching.

The formation of the hole pattern in the resist layer 75 may be performed by using a lithography method. The lithography method may be any one or a combination of two or more selected from the group consisting of nanoimprint lithography, laser interference lithography, photolithography, X-ray lithography, electron beam lithography, and ion beam lithography. In particular, in the method of preparing an electrode of the present invention, the circular cylindrical pattern may be formed in intaglio by nanoimprint lithography. In the case that the pattern is formed by nanoimprint lithography, the resist layer 75 is stamped by using a stamp 80 molded in a shape as shown in FIG. 6D and the resist layer 75 is then cured by using an appropriate method according to properties of a material constituting the resist layer. In particular, in the case that the resist layer 75 is a PDMS-based UV-curable material, the resist layer 75 may be cured by irradiation of UV light.

The inner circumference of the hole may be circular, elliptical, or polygonal. Only circular holes are shown in FIGS. 6B and 6C, the shape of the holes is not limited thereto. In particular, in the case that the holes are formed by nanoimprint lithography, holes having various shapes may be formed according to the shape of the molded stamp.

The transfer of the hole pattern into the sacrificial layer 73 may be appropriately performed by those skilled in the art through various etching method, such as reactive ion etching (RIE) or oxygen plasma etching, by using the resist layer 75 having the hole pattern formed therein as a mask.

Figure 6E:
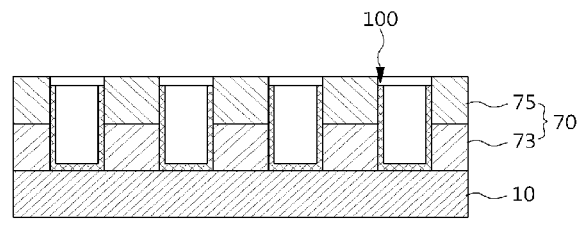
FIG. 6E is a schematic view illustrating the upper surface exposed through the hole pattern and inner circumferences of the hole pattern having metal deposited thereon by glancing angle deposition.
Figure 6E:
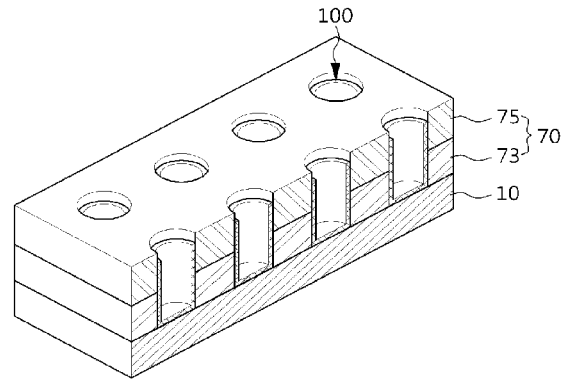
Figure 6F:
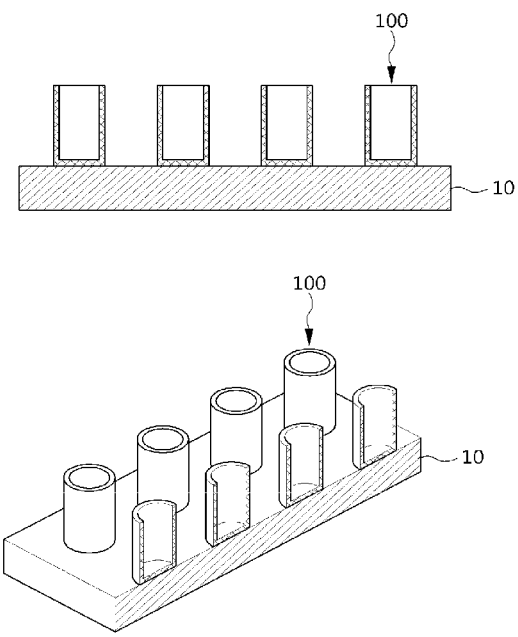
FIG. 6F is a schematic view illustrating an electrode completed by lift-off of a sacrificial layer and a resist layer.

FIG. 6E is a schematic view illustrating the upper surface exposed through the hole pattern and inner circumferences of the hole pattern having metal deposited thereon by glancing angle deposition, and FIG. 6F is a schematic view illustrating an electrode completed by lift-off of a sacrificial layer and a resist layer.

Referring to FIGS. 6E and 6F, metal is deposited on the upper surface of the substrate having the hole pattern formed therein and the inner circumferences of the hole pattern as shown in FIG. 6E. In order to deposit metal on the inner circumferences of the hole pattern and the upper surface of the substrate having the hole pattern formed therein, metal must be deposited by glancing angle deposition while rotating the substrate. The deposition of the metal may be performed by an appropriate method selected by those skilled in the art according to metal to be deposited and density of the pattern. In particular, the deposition may be performed by using a sputter. That metal is deposited in the structure of nanocups is only shown in FIG. 6E, but the shape of the deposited metal nanostructure may also become a nanoring structure according to an angle of glancing angle deposition of metal. That is, the closer an angle of sputter deposition is to 90 degrees with respect to the substrate, metal is deposited in the structure of nanocup, and the closer the angle of sputter deposition is to 0 degrees, metal is deposited in the structure of nanoring. Metal is deposited as shown in FIG. 6E and the polymer layer 70 is then lifted off. The lift-off may be performed by an appropriate method selected by those skilled in the art according to a type and properties of a material constituting the polymer layer 70. In particular, the lift-off may be performed by using a wet etching method.

Hereinafter, preferred embodiments of the present invention will be provided to allow for a clearer understanding of the present invention. However, the following examples are merely provided to more clearly understand the present invention, not to limit the scope of the present invention.

Example 1

Preparation of Metal Nanocups

Figure 7A:
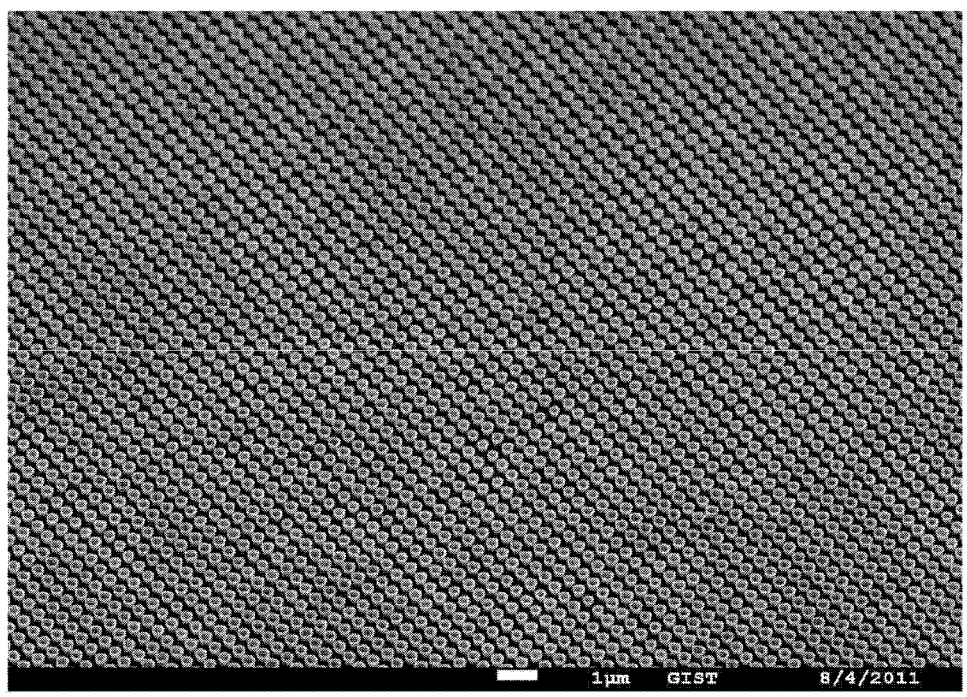
FIGS. 7A and 7B are scanning electron micrographs of metal nanocups formed on a substrate magnified 5,000 times and 50,000 times, respectively.

A polydimethylsiloxane (PDMS)-based resist was deposited on a fluorine-doped tin oxide (FTO) substrate, on which a polymethyl methacrylate (PMMA) sacrificial layer was deposited by spin coating at approximately 3000 rpm for approximately 1 minute, by spin coating at approximately 6000 rpm for approximately 2 minutes, and nanoimprint lithography was then performed to form a hole pattern in the resist layer. The sacrificial layer was etched with oxygen plasma by using the hole pattern formed in the resist layer as a mask to expose the substrate (oxygen gas was introduced into a chamber at a flow rate of approximately 50 sccm to obtain a pressure of approximately 20 mtorr and etching is then performed at approximately 20 W for approximately 250 seconds) and platinum was then deposited through glancing angle deposition at approximately 45 degrees by using a sputter while rotating the substrate (pressure of the chamber was adjusted to approximately 10 mtorr by introducing argon gas at a flow rate of approximately 20 sccm, and a voltage of approximately 325 V was applied to a sputter gun to generate a plasma on a platinum target and platinum was then deposited at a deposition rate of approximately 0.03 nm/sec for approximately 15 minutes). Thereafter, a mask, the sacrificial layer and the resist layer, was lifted off by using acetone (100%) to prepare metal nanocups. The metal nanocups thus prepared were observed by using a scanning electron microscope and micrographs are shown in FIGS. 7A (magnified 5,000 times) and 7B (magnified 50,000 times).

Example 2

Preparation of Metal Nanorings

Figure 7B:
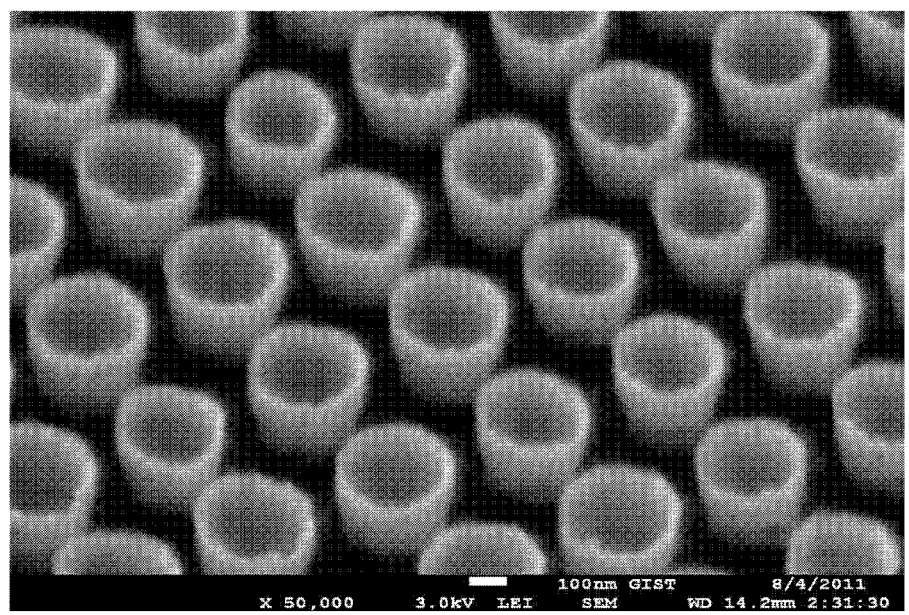

Metal nanorings are prepared in the same manner as Example 1 except that platinum was deposited through glancing angle deposition at approximately 15 degrees by using a sputter while rotating the substrate in the process of glancing angle deposition of platinum. Although scanning electron micrographs of the metal nanorings are not shown in the present specification, it was confirmed that the metal nanorings prepared according to Example 2 had the same uniformity and size as those of the metal nanocups shown in FIGS. 7A and 7B.

An electrode of the present invention includes catalytic metal formed in a metal nanocup or metal nanoring structure and thus, an area, in which a reactant participating in an oxidation or reduction reaction is able to be in contact with catalytic metal, may become wider in comparison to that of a typical electrode having catalytic metal in the shape of a flat thin film. Accordingly, an efficiency of the oxidation or reduction reaction may be improved due to catalytic metal and eventually, a power generation efficiency of a cell may be improved.

However, effects of the present invention are not limited to the aforesaid, but other effects not described herein will be clearly understood by those skilled in the art from descriptions below.

Although the catalytic metal with nanocup or nanoring structure and electrodes using the same has been described with reference to the specific embodiments, it is not limited thereto. Therefore, it will be readily understood by those skilled in the art that various modifications and changes can be made thereto without departing from the spirit and scope of the present invention defined by the appended claims.

What is claimed is:

1. An electrode comprising:
   a substrate;
   a catalytic metal layer formed on the substrate, the metal layer formed of any one or an alloy of two or more selected from the group consisting of Pt, Fe, Co, Ni, Ru, Rh, Pd, Os, Ir, Cu, Ag, Au, Sn, Al, Cr, and Ti;
   a plurality of metal nanocups spaced apart from one another and disposed on the substrate metal layer, and openings thereof are aligned above the substrate metal layer, and
   a spacing between each of the nanocups, wherein the metal layer catalyzes an oxidation or reduction reaction in the spacing between the nanocups,
   wherein the nanocups have a hollow cylindrical shape in which a lower surface thereof is closed;
   wherein the nanocups and the metal layers comprise the same metal or alloy.

2. The electrode of claim 1, wherein the openings of the nanocups are circular, elliptical, or polygonal.

3. The electrode of claim 1, wherein the electrode is a reduction electrode of a dye-sensitized solar cell.

4. The electrode of claim 3, wherein the substrate is a transparent conductive substrate.

5. The electrode of claim 1, wherein the electrode is an electrode of a fuel cell.

6. The electrode of claim 5, wherein the substrate is a conductive porous substrate.

7. An electrode comprising:
   a substrate;
   a catalytic metal layer formed on the substrate, the metal layer formed of any one or an alloy of two or more selected from the group consisting of Pt, Fe, Co, Ni, Ru, Rh, Pd, Os, Ir, Cu, Ag, Au, Sn, Al, Cr, and Ti;
   a plurality of metal nanorings spaced apart from one another and disposed on the substrate metal layer, and first openings thereof are aligned above the substrate metal layer, and
   a spacing between each of the nanorings, wherein the metal layer catalyzes an oxidation or reduction reaction in the spacing between the nanorings,
   wherein the nanorings have a hollow cylindrical shape in which a lower surface thereof is opened;
   wherein the nanorings and the metal layer comprise the same metal or alloy.

8. The electrode of claim 7, wherein the first openings of the nanorings are circular, elliptical, or polygonal.

9. The electrode of claim 7, wherein the electrode is a reduction electrode of a dye-sensitized solar cell.

10. The electrode of claim 7, wherein the electrode is an electrode of a fuel cell.

* * * * *